May 2, 1933.  H. SCHIMMEL  1,907,408
TOOL CARRIER FOR BORING AND SIMILAR MACHINES
Filed Oct. 28, 1932
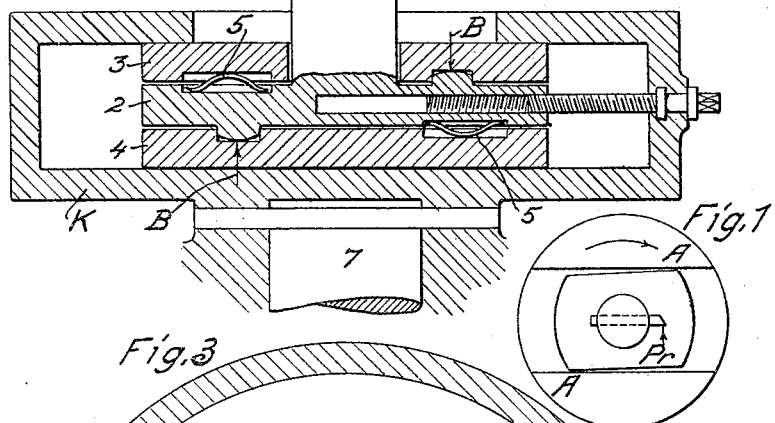
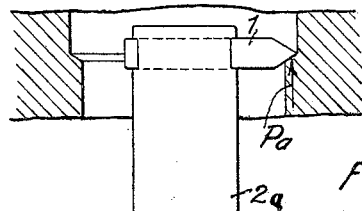
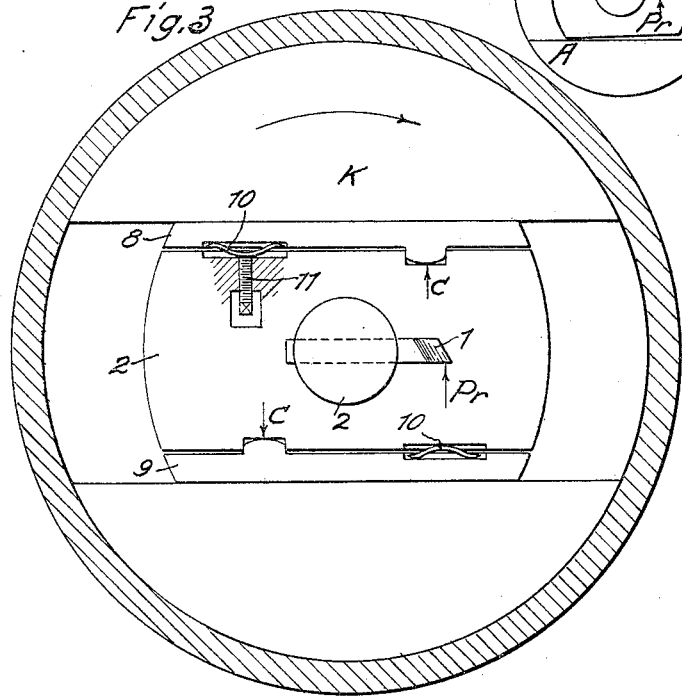
INVENTOR
HANS SCHIMMEL
by his attorneys
Howson and Howson Patented May 2, 1933

1,907,408

UNITED STATES PATENT OFFICE

HANS SCHIMMEL, OF KOMOTAU, CZECHOSLOVAKIA

TOOL CARRIER FOR BORING AND SIMILAR MACHINES

Application filed October 28, 1932, Serial No. 640,081, and in Czechoslovakia February 4, 1931.

This invention is for improvements in and relating to tool carriers for boring and similar machines, such as machines for machining circular flanges and of the type in which relative rotation is effected between the cutting tool and the work and, in addition, the said tool is arranged to be traversed in opposite directions in the tool carrier transversely to the axis of rotation by means of a tool carrying slide mounted in a guide therefor.

Known tool carriers of the above type are defective in respect of a reliable guiding action for the tool during the transverse movements thereof. This defect may readily be appreciated from Figure 1 of the accompanying drawing which represents diagrammatically in plan a known form of tool carrier. The tool is mounted in a boring bar carried by a slide which is slidably mounted in a rotatable guide. The forces produced by the cutting pressure as indicated at $Pr$ in the opposite direction to the rotation of the tool are taken up by the rotating guide at the points A only and, in consequence, the pressure developed at these points is of such a magnitude that movement of the slide is only possible by using considerable force. For the same reason the guides are subjected to excessive wear which necessitates the frequent truing up of the guides which, generally, is difficult to effect.

According to the invention, the above described defects are overcome by the provision of a tool carrier for boring and similar machines of the type described, in which intermediate slides are arranged between the tool carrying slide and the guide and are connected to the said slide each by a pivotal connection located on that side of the axis of rotation of the carrier in the direction of traverse of the tool upon which the working pressure is transmitted, in such a manner that the said pressure is transmitted through the said pivotal connection.

Intermediate slides in the form of bars are known, for example, with slide rests of lathes and pivotal intermediate slides are also known in boring machines for ensuring the position of the cutter tool, but without consideration being paid to the position of the pivot in respect of the cutting pressure of the tool.

In order that the invention may be fully understood, reference is directed to the remaining figures of the accompanying drawing, in which:—

Figure 1 represents diagrammatically in plan a known form of tool carrier.

Figures 2 and 3 illustrate, respectively, in sectional elevation and sectional plan, a tool carrier constructed in accordance with the invention.

Referring to Figure 2, a tool is mounted in the upper end of a boring bar $2a$ carried by a slide 2 and the upward cutting pressure on the tool indicated at $Pa$ is transmitted from the slide 2 to intermediate slide bars 3, 4 through the pivotal connections B. The pivotal connections each comprise a curved projection on the slide, arranged to bear against a flat surface provided at the base of a recess into which the projection extends, so that the one may roll upon the other. The pressure thus transmitted to the slide bars 3, 4 causes them to bear evenly against the guide surface of the guide box K in which they are mounted and which is arranged to be rotated by the boring spindle 7; the pressure developed by the tool is thus evenly distributed over the whole of the guide surfaces.

Referring to Figure 3, the cutting pressure developed in the tool as indicated at $Pr$ is transmitted from the slide 2 to intermediate slide bars 8, 9 through pivotal connections C similar to the connections B and the slide bars 8, 9 are thus caused to bear evenly upon the guide surfaces in the box K.

Springs such as are indicated at 5 in Figure 2 and at 10 in Figure 3 are provided at the opposite ends of the intermediate slide bars to the respective connections B, C between the said slide bars and the slide 2 so as to maintain contact at all times between the intermediate slide bars and the guide surfaces therefor and to provide an automatic adjustment for wear on the slides and the guides. Set screws such as that indicated at 11 in Figure 3 may be provided for adjusting the tension of the springs 5 or 10.

By means of the invention, the wear of the guides is considerably reduced and the movement of the tool carrying slide is considerably facilitated, this being of great importance in boring operations in order to obtain a clean, regular cut, for example, for boring apparatus for machining the grooves of pilger rolls.

What I claim and desire to secure by Letters Patent of the United States is:—

1. A tool carrier of the type described which comprises in combination a rotatable spindle provided at one end with a guide transversely disposed relatively to the axis of rotation of said spindle, a tool carrying slide slidably mounted in said guide, and intermediate slides located between said tool carrying slide and said guide and each operatively connected to said tool carrying slide by a pivotal connection located on that side of the axis of rotation of the carrier in the direction of traverse of the tool carrying slide upon which the working pressure is transmitted, so that said pressure is transmitted solely through said pivotal connections.

2. A tool carrier of the type described which comprises in combination a rotatable spindle provided at one end with a guide transversely disposed relatively to the axis of rotation of said spindle, a tool carrying slide slidably mounted in said guide and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections.

3. A tool carrier of the type described which comprises in combination a rotatable spindle provided at one end with a guide transversely disposed relatively to the axis of rotation of said spindle, a tool carrying slide slidably mounted in said guide and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections, intermediate slides located above and below said tool carrying slide and located between the same and said guide and a pivotal connection between each of last said intermediate slides and said guide located towards that end thereof through which the working pressure from the tool is transmitted axially of said rotatable spindle so that such axial pressure is transmitted through the last said pivotal connections.

4. A tool carrier of the type described which comprises in combination a rotatable spindle provided at one end with a guide transversely disposed relatively to the axis of rotation of said spindle, a tool carrying slide slidably mounted in said guide, an intermediate slide bar located between said tool carrying slide and said guide upon each side thereof and pivotally connected to said tool carrying slide at a point located towards one end thereof on that side of the axis of rotation of the carrier in the direction of traverse of the tool carrying slide upon which the rotative working pressure from the tool is transmitted, so that said pressure is transmitted solely through said pivotal connections, and a spring located between each of said intermediate slide bars and said guide towards the end thereof remote from the respective pivotal connections.

5. A tool carrier of the type described which comprises in combination a rotatable spindle provided at one end with a guide transversely disposed relatively to the axis of rotation of said spindle, a tool carrying slide slidably mounted in said guide and an intermediate slide bar located between said tool carrying slide and said guide upon each side located on that side of the axis of rotation of the carrier in the direction of traverse of the tool carrying slide upon which the rotative working pressure from the tool is transmitted, so that said pressure is transmitted solely through said pivotal connections, intermediate slides located above and below said tool carrying slide and located between the same and said guide, a pivotal connection between each of last said intermediate slides and said guide located towards that end thereof through which the working pressure from the tool is transmitted axially of said rotatable spindle so that such axial pressure is transmitted through the last said pivotal connections, and a spring located between the guide and each of said intermediate slide bars and slides towards the end thereof remote from the respective pivotal connections.

6. A tool carrier of the type described which comprises in combination a rotatable spindle provided at one end with a guide transversely disposed relatively to the axis of rotation of said spindle, a tool carrying slide slidably mounted in said guide, and intermediate slides located between said tool carrying slide and said guide and each operatively connected to said tool carrying slide by a pivotal connection comprising a curved surface on one part bearing against a flat surface on the other part and located on that side of the axis of rotation of the carrier in the direction of traverse of the tool carrying slide upon which the working pressure is transmitted, so that said pressure is transmitted solely through said pivotal connections.

7. A tool carrier of the type described which comprises in combination a rotatable spindle provided at one end with a guide transversely disposed relatively to the axis of rotation of said spindle, a tool carrying slide slidably mounted in said guide and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections, each of said pivotal connections comprising a curved surface on one part bearing against a flat surface on the other part.

8. A tool carrier of the type described which comprises in combination a rotatable spindle provided at one end with a guide transversely disposed relatively to the axis of rotation of said spindle, a tool carrying slide slidably mounted in said guide, and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections, intermediate slides located above and below said tool carrying slide and located between the same and said guide and a pivotal connection between each of last said intermediate slides and said guide located towards that end thereof through which the working pressure from the tool is transmitted axially of said rotatable spindle so that such axial pressure is transmitted through the last said pivotal connections, each of said pivotal connections comprising a curved surface on one part bearing against a flat surface on the other part.

9. A tool carrier of the type described which comprises in combination a rotatable spindle provided at one end with a guide transversely disposed relatively to the axis of rotation of said spindle, a tool carrying slide slidably mounted in said guide, an intermediate slide bar located between said tool carrying slide and said guide upon each side thereof and pivotally connected to said tool carrying slide at a point located towards one end thereof on that side of the axis of rotation of the carrier in the direction of traverse of the tool carrying slide upon which the rotative working pressure from the tool is transmitted, so that said pressure is transmitted solely through said pivotal connections, and a spring located between each of said intermediate slide bars and said guide towards the end thereof remote from the respective pivotal connections, each of said pivotal connections comprising a curved surface on one part bearing against a flat surface on the other part.

10. A tool carrier of the type described which comprises in combination a rotatable spindle provided at one end with a guide transversely disposed relatively to the axis of rotation of said spindle, a tool carrying slide slidably mounted in said guide and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections, intermediate slides located above and below said tool carrying slide and located between the same and said guide, a pivotal connection between each of last said intermediate slides and said guide located towards that end thereof through which the working pressure from the tool is transmitted axially of said rotatable spindle so that such axial pressure is transmitted through the last said pivotal connections, and a spring located between the guide and each of said intermediate slide bars and slides towards the end thereof remote from the respective pivotal connections, each of said pivotal connections comprising a curved surface on one part bearing against a flat surface on the other part.

11. A tool carrier of the type described which comprises in combination a rotatable spindle provided at one end with a guide transversely disposed relatively to the axis of rotation of said spindle, a tool carrying slide slidably mounted in said guide, and intermediate slides located between said tool carrying slide and said guide and each operatively connected to said tool carrying slide by a pivotal connection comprising a curved surface formed upon a projection on the one part arranged to extend into a recess formed in the other part and with said curved surface bearing against a flat surface provided at the base of said recess and located on that side of the axis of rotation of the carrier in the direction of traverse of the tool carrying slide upon which the working pressure is transmitted, so that said pressure is transmitted solely through said pivotal connections.

12. A tool carrier of the type described which comprises in combination a rotatable spindle provided at one end with a guide transversely disposed relatively to the axis of rotation of said spindle, a tool carrying slide slidably mounted in said guide and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections, each of said pivotal connections comprising a curved surface formed upon a projection on the one part arranged to extend into a recess formed in the other part and with said curved surface bearing against a flat surface provided at the base of said recess.

13. A tool carrier of the type described which comprises in combination a rotatable spindle provided at one end with a guide transversely disposed relatively to the axis of rotation of said spindle, a tool carrying slide slidably mounted in said guide, and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections, intermediate slides located above and below said tool carrying slide and located between the same and said guide, and a pivotal connection between each of last said intermediate slides and said guide located towards that end thereof through which the working pressure from the tool is transmitted axially of said rotatable spindle so that such axial pressure is transmitted through the last said pivotal connections, each of said pivotal connections comprising a curved surface formed upon a projection on the one part arranged to extend into a recess formed in the other part and with said curved surface bearing against a flat surface provided at the base of said recess.

14. A tool carrier of the type described which comprises in combination a rotatable spindle provided at one end with a guide transversely disposed relatively to the axis of rotation of said spindle, a tool carrying slide slidably mounted in said guide, an intermediate slide bar located between said tool carrying slide and said guide upon each side thereof and pivotally connected to said tool carrying slide at a point located towards one end thereof on that side of the axis of rotation of the carrier in the direction of traverse of the tool carrying slide upon which the rotative working pressure from the tool is transmitted, so that said pressure is transmitted solely through said pivotal connections, and a spring located between each of said intermediate slide bars and said guide towards the end thereof remote from the respective pivotal connections, each of said pivotal connections comprising a curved surface formed upon a projection on the one part arranged to extend into a recess formed in the other part and with said curved surface bearing against a flat surface provided at the base of said recess.

15. A tool carrier of the type described which comprises in combination a rotatable spindle provided at one end with a guide transversely disposed relatively to the axis of rotation of said spindle, a tool carrying slide slidably mounted in said guide and an intermediate slide bar located between said tool carrying slide and said guide upon each side thereof and pivotally connected to said tool carrying slide at a point located on that side of the axis of rotation of the carrier in the direction of traverse of the tool carrying slide upon which the rotative working pressure from the tool is transmitted, so that said pressure is transmitted solely through said pivotal connections, intermediate slides located above and below said tool carrying slide and located between the same and said guide, a pivotal connection between each of last said intermediate slides and said guide located towards that end thereof through which the working pressure from the tool is transmitted axially of said rotatable spindle so that such axial pressure is transmitted through the last said pivotal connections, and a spring located between the guide and each of said intermediate slide bars and slides towards the end thereof remote from the respective pivotal connections, each of said pivotal connections comprising a curved surface formed upon a projection on the one part arranged to extend into a recess formed in the other part and with said curved surface bearing against a flat surface provided at the base of said recess.

HANS SCHIMMEL.